Nov. 19, 1935.　　　W. R. WHITNEY　　　2,021,760
MOISTURE INDICATOR
Filed Jan. 13, 1932
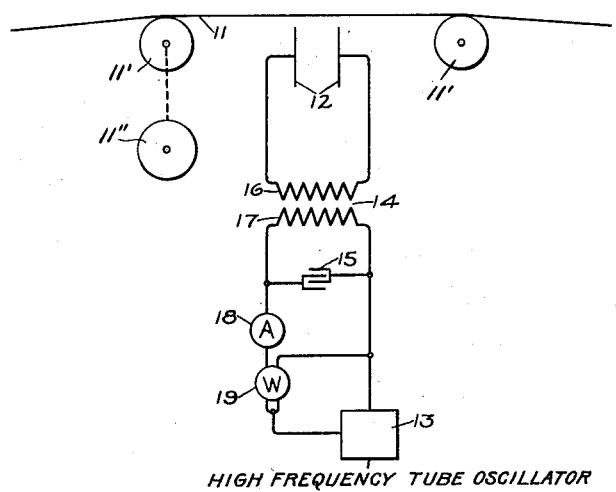
HIGH FREQUENCY TUBE OSCILLATOR
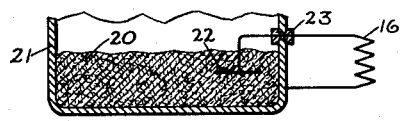
Inventor:
Willis R. Whitney,
by Charles A. Mullen
His Attorney.

Patented Nov. 19, 1935

2,021,760

UNITED STATES PATENT OFFICE 2,021,760

MOISTURE INDICATOR

Willis R. Whitney, Niskayuna, N. Y., assignor to General Electric Company, a corporation of New York Application January 13, 1932, Serial No. 586,362

7 Claims. (Cl. 175—183)

My invention relates to methods and arrangements for determining or controlling the moisture content of a material, and has for its principal object the provision of such arrangements in which a direct indication is continuously obtained of the moisture content. Other objects will become apparent as the description proceeds.

In accordance with my invention I bring the material, the moisture content of which is to be measured, in proximity to the electrodes of a condenser connected to a source of high frequency currents. Heating currents are set up in the material which are reflected as a dielectric loss of the condenser. The magnitude of this loss, and consequently also the energy input to the condenser are dependent upon the moisture content of the material being tested. Accordingly, a device responsive to the energy input may be calibrated directly in moisture content. The features of my invention which I believe to be novel and patentable will be pointed out in the claims appended hereto.

For a more complete understanding of my invention reference may be had to the accompanying drawing in which Fig. 1 represents an arrangement responsive to the moisture content of a moving sheet of continuous material and Fig. 2 represents a modified arrangement for obtaining the moisture content of bulk material.

Referring now more in detail to the drawing, there is represented at 11 a strip of continuously moving sheet material, for example, a sheet of paper, coming from a paper making machine. Sheet 11 may be carried by a pair of rolls 11', one or both of which are driven by a motor 11'' in order to maintain the strip 11 in continuous motion. A pair of electrodes or plates 12 forming a condenser are so located that the sheet 11 passes in proximity thereto but does not touch the electrodes 12. The plates or electrodes 12 are connected in a high frequency circuit supplied by the high frequency tube oscillator 13 which may be of any suitable type. The potential difference existing between the plates 12 causes a portion of the sheet 11 to be subjected to electrostatic stresses alternating at a high frequency. In consequence heating currents are set up in the portion of the sheet 11 within the field of influence of electrodes 12 and a power loss current is drawn by the condenser formed by the electrodes 12. This energy input corresponds to a dielectric loss.

Preferably, a high frequency transformer 14 having a secondary winding 16 connected to the electrodes 12 and primary winding 17 connected to high frequency oscillator 13 is interposed between the oscillator and the condenser 12. The condenser 15 shunting the winding 17 is given such a capacity as to stabilize the frequency of the circuit at a desired value, and the use of the transformer 14 permits stepping up the voltage between the plates 12 such a value that appreciable currents will be drawn from the oscillator 13 by reason of the moisture content of the sheet 11.

Increase in power loss of the condenser 12 caused by increased moisture content of sheet 11 increases the input to the condenser 12 of the required output from the high frequency oscillator. The current flowing in a high frequency ammeter 18 will necessarily be dependent upon the output of the oscillator 13 and will accordingly provide an indication of the moisture content of the sheet 11. However, if desired, I may supply a wattmeter 19 of any suitable type for high frequency circuits. For example, I may utilize a vacuum tube wattmeter of the type disclosed in the application of Milton S. Mead, Serial No. 569,288, filed October 16, 1931, and assigned to the same assignee as the present invention. Obviously my invention is not limited to the specific indicating arrangements illustrated but includes the use of any other devices responsive to variations in the losses of the condenser 12 such as power factor or phase angle responsive instruments.

The condenser 12 has several properties which vary in magnitude with the moisture content of the material 11 forming a part of the dielectric of the condenser. The variations in any of these properties may be made use of to provide indications of variations in moisture content; but I prefer to utilize apparatus responsive to the power loss of the condenser since such apparatus, not being dependent upon the phenomenon of resonance, is less sensitive to unavoidable variations in frequency or in the characteristics of portions of the circuit. Furthermore, observations may be made directly without the necessity of adjusting variable portions of the circuit. Since variable elements are unnecessary the construction is simplified and greater sturdiness and reliability of performance are obtained.

It will be understood that the instruments 18 or 19 may take the form of indicating instruments, recording instruments, or of contact making devices which serve to control apparatus for regulating the moisture content of the material 11. It will be seen that the use of my apparatus permits obtaining instantaneous indications of the moisture content of sheet 11 without interrupting the motion of the sheet in the course of the manufacturing operation and without mutilating any portions thereof.

It will be obvious that moisture indicating apparatus of the type described will also be applicable to moisture measurements of many other types of material. For example, in Fig. 2 I have shown an arrangement for obtaining moisture indications of a bulk material 20 contained in a vessel 21. It is immaterial whether the vessel 21 is of the type in which the bulk material 20 passes continuously into one portion of the vessel and out from another portion in the course of a manufacturing operation, or of the type in which the material 20 remains in the vessel and the moisture indications are obtained continuously during the heating or the performance of some other operation upon the material 20. The vessel 21 which in the specific arrangement shown is preferably composed of a conducting substance is provided with an insulated electrode 22. The vessel 21 and the electrode 22 are connected to the secondary winding 16 of the transformer shown in the apparatus illustrated in Fig. 1. An insulating bushing 23 is provided for the conductor connecting the electrode 22 and the transformer winding 16. Preferably the conductor and electrode 22 are also insulated from the mass of material 20. As in the arrangement shown in Fig. 1, the potential difference between electrodes 21 and 22 subject the portion of the material 20 to electrostatic stresses oscillating at a high frequency, thereby causing the condenser formed by electrodes 21 and 22 to draw a current represented by the dielectric loss in the material.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other arrangements.

What I claim as new and desire to secure by Letters Patent of the United States, is,—

1. Apparatus responsive to the moisture content of a material comprising electrodes arranged to subject said material to electrostatic stress, a high frequency transformer having a secondary winding connected to said electrodes, means for supplying high frequency currents to said transformer, and untuned power measuring means responsive to the input to said transformer.

2. Apparatus responsive to the moisture content of sheet material comprising a pair of electrodes forming a condenser, means for passing said sheet material at one side of said electrodes in such proximity thereto as to affect the dielectric losses of said condenser, means for supplying high frequency currents thereto, and means actuated in accordance with a direct function of the input to said condenser.

3. Apparatus responsive to the moisture content of a material, comprising electrodes forming a condenser, means for supplying high frequency currents to said condenser, means for continuously passing said material at one side of said electrodes in proximity thereto so as to subject successive portions of said material to electrostatic stress, and means actuated in accordance with a direct function of the input to said condenser.

4. The method of determining the moisture content of a material which comprises placing the material at one side of a pair of electrodes within the electrostatic field of the electrodes to form a condenser, supplying high-frequency current to said electrodes and determining the electrical power input to the condenser thus formed.

5. The method of determining the moisture content of a material which comprises placing the material at one side of a pair of electrodes within the electrostatic field of the electrodes, supplying high-frequency current to said electrodes and measuring an electrical quantity in the current supply circuit which varies as a direct function of the electrical power input to the condenser thus formed.

6. The method of continuously determining the moisture content of portions of a material which comprises passing said material continuously at one side of a pair of electrodes through a portion of the electrostatic field of the electrodes forming a condenser with the adjacent portion of said material as a dielectric, supplying high-frequency currents to the condenser thus formed and measuring an electrical quantity in the circuit supplying said condenser which varies as a direct function of the electrical energy supplied to said condenser.

7. Apparatus responsive to the moisture content of a material comprising a pair of electrodes forming a condenser, means for supporting said material at one side of said electrodes in proximity thereto, whereby the material is subjected to electrostatic stress by said condenser electrodes, means for supplying a high frequency current to said condenser, and means actuated in accordance with a direct function of the energy supplied to said condenser.

WILLIS R. WHITNEY.